March 16, 1937. S. SUZUKI 2,073,766
AIR VALVE FOR USE IN INFLATED BALLS
Filed July 11, 1935
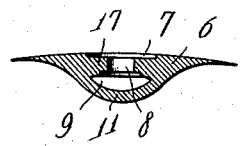
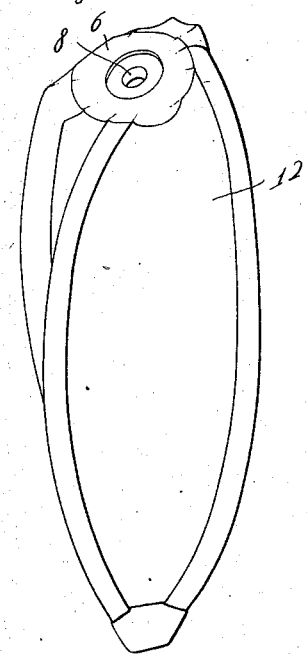
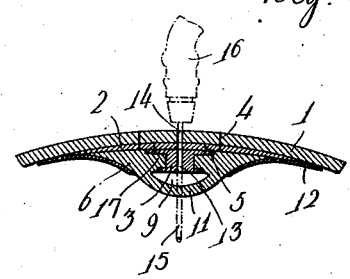
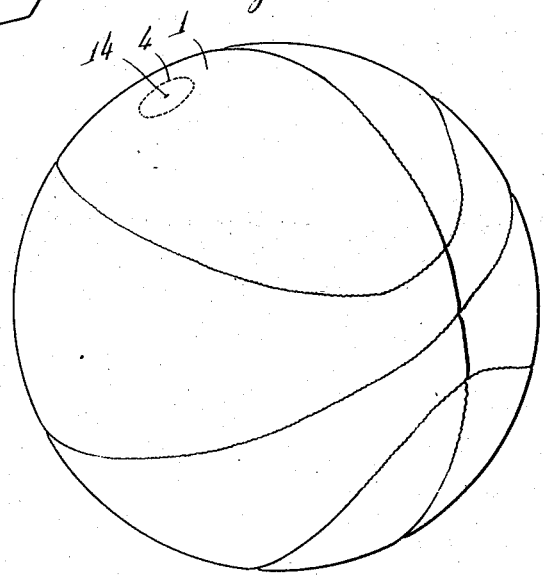
Inventor
Shigetake Suzuki
By E. F. Wenderoth
Attorney Patented Mar. 16, 1937

2,073,766

UNITED STATES PATENT OFFICE 2,073,766

AIR VALVE FOR USE IN INFLATED BALLS

Shigetake Suzuki, Yoyogi, Shibuya-ku, Tokyo-shi, Japan

Application July 11, 1935, Serial No. 30,910
In Japan July 16, 1934

3 Claims. (Cl. 273—65)

This invention relates to improvements in an air valve for use in inflated balls, i. e. basket-ball and foot-ball etc. The main object of this invention is a provide an automatically acting air valve which acts perfectly in spite of its simple construction and is easy of use.

The characteristic features of the valve of this invention are in that, first, it is simple in construction, light in weight and small in volume, second, as no part of the valve projects, vibration and shock do not affect the perfect action there-of, third, as this valve is made entirely of rubber and the pressure to shut off air is very high in relation to the inflated pressure, air shutting action of the valve is not affected by insertion of foreign particles such as, for example, dust and sand, fourth, a bladder provided with this valve is very easily detached and replaced for repairing or renewing, fifth, in manufacturing, as this valve is simple in construction and made entirely of rubber, it can be vulcanized in one operation even when different kinds of rubber are used in the base and convex parts of the valve.

Further objects and characteristics of this invention will be made apparent in the following specification referring to the accompanying drawing.

In the drawing, Fig. 1 is a cross sectional view of the valve of this invention, Fig. 2 is a perspective view of a bladder provided with the air valve of this invention, Fig. 3 is a cross sectional partial view of a basket-ball which has a bladder provided with the air valve of this invention, showing how the outer-leather of a ball, a button attached to the inner side of said leather and the air valve of this invention are connected to each other and how the air is fed and discharged there-through and Fig. 4 is a perspective external view of a basket-ball which has a bladder provided with the air valve of this invention.

Referring to the drawing, 1 is the outer-leather of the ball, 2 is a round patch with a small hole in its center made of, for example, leather, hard rubber or strong cloth, etc., which is sewn to the outer-leather 1 with string 4, to said patch is previously fixed a button 3 which is made of, for example, bakelite, duralumin or other hard material with string 5, said button has a passage hole 13 in its center to allow an inflation needle to pass there-through. 6 is the air valve of this invention, which is attached to the bladder 12, said bladder being, in turn, attached to the ball by the button 3. 9 is a hollow space which is in communication with the outer air by the passage 13 of the button and a passage 14 of the outer-leather of the ball.

To inflate the ball, an inflation needle 15 is pierced through said passages 14 and 13, thrusting the valve, into the bladder and a pump fitted at the outer end of a rubber tube 16 connected to said needle is put in operation. To deflate the ball, the air valve being only pierced with said needle, the compressed air in the bladder is allowed to discharge there-through by itself.

When the ball is inflated, the convex part 11 of the air valve is forced to flatten by the inner pressure of the bladder thereby shutting the puncture or vestige at the center of said convex part.

As the base 17 of the valve is harder and smaller in diameter compared to the convex part 11 of the valve, when the ball is inflated, the base diameter of said convex part will scarcely expand to any extent. The base 17 may be of larger diameter if it is thicker or made of harder rubber than the convex part, or have some ragged or rough surface to have friction against the inner surface of the ball or the patch 2. If the valve is constructed in these ways, the base diameter of the convex part will scarcely expand to any extent.

Generally speaking, valve action to stop air is due to that the pressure which is caused at the air passage must be higher than that of the inside. And it is irrespective of the area or length of the passage. This is a very simple and self-evident truth, but automatically acting valves which are inflated by a needle heretofore known require a long passage, for example, of an inch or more. Further-more, the rubber of these valves must be extremely soft and elastic. With all such fulfilments, valves heretofore known can hardly remain faultless after two or three hundred thrusts of the needle. Practically a ball cannot be inflated in one thrust but must be repeated two or more times. Therefore the valve must bear up against at least three hundred thrusts in its whole life. Under these circumstances, some of these valves hereto known are heavy and give much resistance to the thrust of the needle as they have a long passage. Other valves must have some large choking device of the air passage. Such valves as these are not easy to handle and valves of this kind easily come out of choking device. Some valves must have something in the air passage to check the air now when inflated, or have some mechanism like a stop valve of ordinary use for machines, or have two parts which are to contact with each other when inflated. All these valves must not only have complicated construction but, when some relatively large particles, i. e., large grains of sand or several particles of dust become inserted between two parts of the valve, they are also deprived of their perfect action. Because the pressure between these contact places are almost equal or a little lower than the inside pressure. It is a well-known fact that a valve which can be used by only thrusting an inflation needle is best for use in inflated balls. But there has been no such valve of this type which can be suitably and practically used in the inflated balls to date.

In case of the valve according to this invention, the pressure obtained at the passage of air is more than one and half times of the inner pressure, as can be approximately calculated from decreasing area of the valve bottom and stress strain diagram and Poisson's ratio of rubber. Therefore, the length of the air passage i. e. thickness of the convex part is enough with 1/32 of an inch or less from my actual experiences. Technicians on rubber suggested that no rubber wall of 1/32 of inch thick, when pierced with an inflation needle, could stop air pressure of 13 lbs. per square inch. However, the valve of this invention is able to be used satisfactorily with no leakage of air even after more than 8000 thrusts of the needle.

This valve is fool-proof. Because, when the passage is damaged by thrusting of the inflation needle, the high pressure in the convex part of the valve caused by the inner pressure of the ball will close the passage as before. It is also fool-proof, for the valve will not lose its elasticity for a period of two or three years as shown by tests made in Gear's aging oven. If it is desired to use a valve for more years, it is preferable to add suitable anti-oxidant in the rubber. Then it will not lose its elasticity for many years.

As shown in the accompanying drawing, the valve of this invention is simple in construction, small in size and light in weight so that it weighs less than one seventh of ounce, including the patch in an example. As the construction of this valve is thus very compact and flat and, further, no part there-of projects, it can be very rigidly attached to the leather of the ball and, consequently, will withstand the vibration and hard shock of rough usage.

The method of attaching the valve to the ball is very simple. It does not require to be fastened by metal pieces nor pasted by rubber cement nor screwed in. To attach the valve to the ball, folding the valve outwardly to cause the hole of the valve to open, it is pushed against the button swinging to and fro and engaged there-on. To detach the valve from the ball it is sufficient to pull the bladder to which the valve is attached. Even though the valve can be attached in this simple manner, it will not come off, for the resistance to thrusting is very slight owing to the thinness of the valve bottom. In order to let the needle slip more easily, it is a good idea that a little amount of viscous lubricant, which will not harm the rubber, is applied to the hollow space 9 of the valve before attaching.

In order to attach the button to the ball, it is preferable that the button be made of some hard material, for example, such as bakelite, duralumin or aluminium etc., which has a small hole in its center is previously sewed on the patch 2, which also has a small hole in its center, and said patch is, in turn, sewed on the inner side of the leather of the ball so as that the central holes are connected precisely to each other. Even when the valve is attached directly to the ball without using a patch, the button cannot be felt from the outside of the ball in the state of being inflated, for it is, on one hand, very light, weighing less than one fiftieth of an ounce in an example and, on the other, has a recess to receive the flange of the button.

It is also a good idea that the bottom of the valve is made of soft rubber and the upper part or the base of harder rubber so as to let each part of the valve accomplish their respective object, that is to say, to check the air tightly in the former and to fasten the valve rigidly to the button in the latter.

Although I have herein described only of one embodiment of my invention, it should be understood that various changes may be made in the details of construction and arrangement of parts without departing from the spirit of my invention.

Having now described my invention what I claim is:—

1. An air valve for inflatable articles comprising an outside casing having a perforation, a button shaped element of non-resilient material having a perforation in alignment with said first-mentioned perforation, a bladder, a resilient valve member attached to said bladder and adapted to be detachably mounted upon said button-shaped element, said valve member having a hollow space therein, said valve member being maintained in closed condition by pressure from the interior of the inflated article, said valve member collapsing into said hollow space and against the lower end of the perforation in the button-shaped element.

2. An automatically sealing air valve for inflatable articles of manufacture comprising an outer casing having a perforation therein, a patch of tough flexible material secured to the inner periphery of a portion of said casing and having a perforation therein in substantial alignment with said perforation in said casing, a button-shaped element carried by said patch, said element having extended upper and lower surfaces and a shank of relatively small diameter, said element also having a perforation in alignment with the other perforations, a bladder, and a resilient valve member affixed to said bladder and adapted to be snapped over the lower surface of said button-shaped element, whereby a portion of said valve member will grip said shank tightly; said valve member being pierced by a needle for purposes of inflation, and so acted on by pressure from the interior of said article when inflated that the aperture formed by said inflation needle in said valve member is hermetically closed.

3. An automatically sealing air valve for inflatable articles of manufacture comprising an outer casing having a perforation therein, a patch of tough flexible material secured to the inner periphery of a portion of said casing and having a perforation therein in substantial alignment with said perforation in said casing, a button-shaped element carried by said patch, said element having extended upper and lower surfaces and a shank of relatively small diameter, said element also having a perforation in alignment with the other perforations, a bladder, and a resilient valve member affixed to said bladder and adapted to be snapped over the lower surface of said button-shaped element, whereby a portion of said valve member will grip said shank tightly; said valve member having a hollow space therein, said valve member being maintained in closed condition by pressure from the interior of the inflated article, said valve member collapsing into said hollow space and against the lower end of the perforation in the button-shaped element.

SHIGETAKE SUZUKI.